(12) United States Patent
Barlier et al.

(10) Patent No.: US 11,074,753 B2
(45) Date of Patent: Jul. 27, 2021

(54) MULTI-PASS OBJECT RENDERING USING A THREE- DIMENSIONAL GEOMETRIC CONSTRAINT

(71) Applicant: Apple Inc., Cupertino, CA (US)

(72) Inventors: Guillaume P. Barlier, San Mateo, CA (US); Jason D. Rickwald, Santa Cruz, CA (US); Christopher J. Romney, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/889,696

(22) Filed: Jun. 1, 2020

(65) Prior Publication Data

US 2020/0380781 A1 Dec. 3, 2020

Related U.S. Application Data

(60) Provisional application No. 62/856,138, filed on Jun. 2, 2019.

(51) Int. Cl.
*G06T 17/20* (2006.01)
*G06T 13/40* (2011.01)

(52) U.S. Cl.
CPC ............ *G06T 17/205* (2013.01); *G06T 13/40* (2013.01); *G06T 2210/22* (2013.01)

(58) Field of Classification Search
None
See application file for complete search history.

(56) References Cited

U.S. PATENT DOCUMENTS

| | | | |
|---|---|---|---|
| 8,694,899 B2* | 4/2014 | Goossens | G06Q 50/01 715/763 |
| 2012/0079378 A1* | 3/2012 | Goossens | G06F 3/04815 715/706 |
| 2014/0022249 A1* | 1/2014 | Ye | G06K 9/00 345/420 |
| 2014/0132598 A1* | 5/2014 | Narukawa | G06T 15/20 345/419 |
| 2014/0362091 A1* | 12/2014 | Bouaziz | G06T 15/503 345/473 |
| 2015/0084950 A1* | 3/2015 | Li | G06K 9/00214 345/419 |

(Continued)

FOREIGN PATENT DOCUMENTS

WO    WO 2018128996 A1 *    1/2017    ............ G06T 13/00

*Primary Examiner* — Vu Nguyen
(74) *Attorney, Agent, or Firm* — Morgan, Lewis & Bockius LLP

(57) ABSTRACT

A device for performing multi-pass object rendering using a three-dimensional geometric constraint may include at least one processor configured to receive a mesh of points corresponding to a head of a user. The at least one processor may be further configured to render an image of a sphere and to render elements corresponding to facial features based at least in part on the mesh of points. The at least one processor may be further configured to render an element visibility mask based at least in part on the mesh of points, the element visibility mask being constrained to the surface of the sphere. The at least one processor may be further configured to composite the sphere, the elements, and the element visibility mask to generate an output image. The at least one processor may be further configured to provide the output image for display.

20 Claims, 9 Drawing Sheets

(56) References Cited

U.S. PATENT DOCUMENTS

| | | |
|---|---|---|
| 2015/0325029 A1* | 11/2015 | Li .............................. G06T 7/20 |
| | | 382/103 |
| 2017/0039752 A1* | 2/2017 | Quinn ..................... G06T 19/20 |
| 2017/0069124 A1* | 3/2017 | Tong ................... G06F 16/5854 |
| 2017/0098122 A1* | 4/2017 | el Kaliouby ........... G16H 50/30 |
| 2017/0178287 A1* | 6/2017 | Anderson ........... G06K 9/00228 |
| 2017/0193684 A1* | 7/2017 | Du ..................... G06K 9/00315 |
| 2017/0310934 A1* | 10/2017 | Du ................... H04N 21/44008 |
| 2018/0091732 A1* | 3/2018 | Wilson ............... H04N 5/23293 |
| 2018/0182145 A1* | 6/2018 | Imoto .................. G06T 17/205 |
| 2021/0056747 A1* | 2/2021 | Hefny ....................... G06T 7/13 |

* cited by examiner

MULTI-PASS OBJECT RENDERING USING A THREE-DIMENSIONAL GEOMETRIC CONSTRAINT

CROSS REFERENCE TO RELATED APPLICATIONS

This application claims the benefit of priority to U.S. Provisional Patent Application No. 62/856,138, entitled "Multi-Pass Object Rendering Using a Three-Dimensional Geometric Constraint," and filed on Jun. 2, 2019, the disclosure of which is hereby incorporated herein in its entirety.

TECHNICAL FIELD

The present description relates generally to multi-pass object rendering, including multi-pass object rendering using a three-dimensional geometric constraint.

BACKGROUND

Users may use messaging applications to communicate with each other. The users may personalize their messages by adding particular images, which may be referred to as stickers and/or emoticons, for example. Users may also create three-dimensional representations or models of themselves, e.g., avatars, (and/or use pre-configured three-dimensional models) which may be used to further personalize messages and/or other types of communications.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
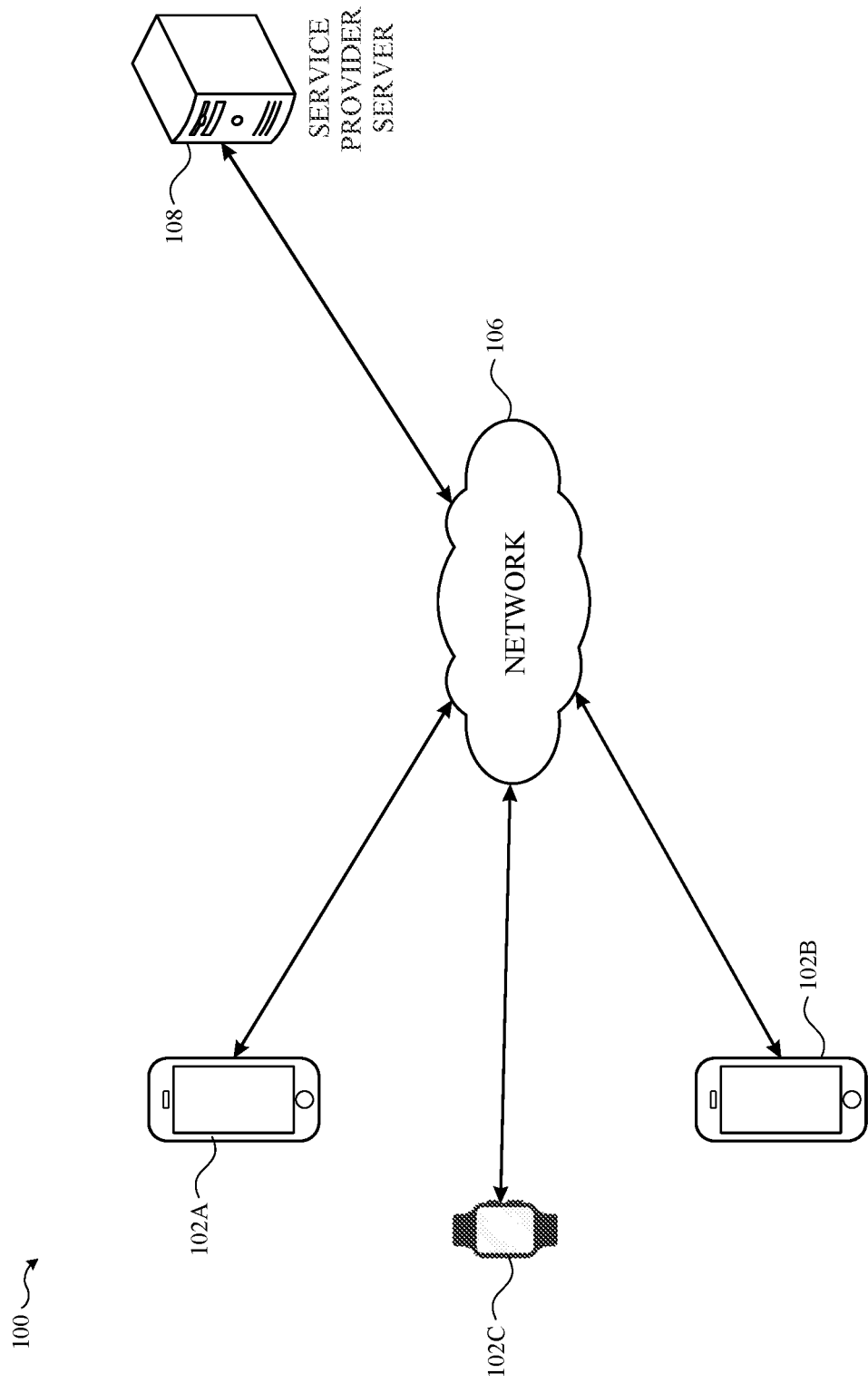
FIG. 1 illustrates an example network environment in which multi-pass object rendering using a three-dimensional geometric constraint may be implemented in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Users may use two-dimensional images (e.g., stickers, emoticons, etc.) and/or three-dimensional models/representations (e.g., avatars) to customize/personalize messages and other content. For example, a user may create a three-dimensional model of themselves and may use the model in conjunction with face/head tracking technology to, e.g., generate and communicate animated messages that mirror the user's facial movements. It may be appealing and/or desirable for users to transform one or more of the two-dimensional images (e.g., stickers, emoticons, etc.) into a three-dimensional model. For example, some of the emoticons, e.g. the smiley face emoticon ( ☺ ), may be considered particularly iconic and therefore may be appealing/desirable to transform into a three-dimensional model.

Existing three-dimensional models may be rendered directly, where the facial features and face/head are rendered together. However, since the smiley face emoticon is constrained to a three-dimensional geometric shape, e.g., a sphere, rendering facial features in the same pass as rendering the head (e.g., sphere) may result in distortion and artifacts. For example, the stretch lines and effects that are acceptable for viewing on a face of a person or animal, e.g. when the person or animal smiles, may be distorted when applied to a head that is constrained to a particular three-dimensional geometric shape, e.g., a sphere.

The subject technology separates the rendering of the three-dimensional model into a multi-pass rendering process, where each rendering pass is constrained to a particular three-dimensional geometric shape, e.g., a sphere. A first rendering pass may render an image of the sphere itself, where each point that is rendered on the surface of the sphere is constrained to be a particular distance from the center of the sphere. A second rendering pass may render an image of only the facial features that will be included on the sphere, the rendering of the facial features also being constrained to the shape of the sphere. A third rendering pass may render a facial features visibility mask that is used to mask out portions of the facial features that should not be visible to the user, e.g., based on the shape of the sphere. The images and mask are composited to generate an output image that is then displayed to the user. The rendering may occur in real-time such that a three-dimensional model corresponding to a smiley face emoticon can be displayed to the user in animated form with the animations mirroring the facial movements of the user.

FIG. 1 illustrates an example network environment 100 in which multi-pass object rendering using a three-dimensional geometric constraint may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-C, a network 106, and a service provider server 108. The network 106 may communicatively (directly or indirectly) couple, for example, any two or more of the electronic devices 102A-C and/or the service provider server 108.

The network 106 may be an interconnected network of devices that may include, or may be communicatively coupled to, the Internet. The service provider server 108 may include one or more server devices and/or network equipment that facilitates providing one or more services to the electronic devices 102A-B over the network 106, such as a messaging service, a secure cloud storage service, and the like. In one or more implementations, one or more of the electronic devices 102A-C may be associated with and/or registered to a user account via the service provider server 108. The service provider server 108 may be, and/or may include all or part of, the electronic system discussed below with respect to FIG. 9.

One or more of the electronic devices 102A-C may be, for example, a portable computing device such as a laptop computer, a smartphone, a peripheral device (e.g., a digital camera, headphones), a tablet device, a smart speaker, a set-top box, a content streaming device, a wearable device such as a watch, a band, and the like, or any other appropriate device that includes one or more wireless interfaces, such as one or more near-field communication (NFC) radios, WLAN radios, Bluetooth radios, Zigbee radios, cellular radios, and/or other wireless radios. In FIG. 1, by way of example, the electronic devices 102A-B are depicted as mobile phones and the electronic device 102A is depicted as a smartwatch. One or more of the electronic devices 102A-C may be, and/or may include all or part of, the electronic device discussed below with respect to FIG. 2, and/or the electronic system discussed below with respect to FIG. 9.

One or more of the electronic devices 102A-C, such as the electronic device 102A may store one or more three-dimensional models that may be used, for example, to customize/personalize messages. For example, the electronic device 102A may include face-tracking technology that can generate a mesh of points that corresponds to the user's face. The mesh of points can be applied to one of the three-dimensional models to animate the model to coincide with the movement of the user's face, head, and/or individual facial features. The electronic device 102A may also capture audio spoken by the user, the output of which may also be synchronized with the animation of the three-dimensional model, such that the three-dimensional model has the appearance of speaking in the same manner as the user.

The three-dimensional models stored on the electronic device 102A may include pre-configured three-dimensional models, e.g., in the form of an animal head and/or body, an alien head and/or body, emoticon head and/or body (e.g., smiley face emoticon), etc., and/or the three-dimensional models stored on the electronic device 102A may include user-configured three-dimensional models, such as corresponding to the head of the user.

The pre-configured and/or user-configured three-dimensional models may be stored on the electronic devices 102A-C as, and/or in conjunction with, a set of parameters, a configuration of a set of parameters, and/or a set of instructions for configuring a particular set of parameters, which may also be referred to as a recipe for a three-dimensional model. For example, in the case of a user-configured three-dimensional model, the set of parameters may indicate skin color, hair color, eye color, eye type, mouth type, accessory information, etc., or generally any information that can be used to render the three-dimensional model. The set of parameters and/or corresponding instructions can be used to render the model using one or more components/assets (e.g. graphical components) that may be locally stored and/or obtained at the electronic device 102A. In one or more implementations, the rendered three-dimensional models may be cached on the electronic device 102A and/or may be dynamically generated when requested.

In the subject system, when a user of the electronic device 102A selects the three-dimensional model corresponding to the smiley face emoticon, the electronic device 102A adaptively changes the rendering of the three-dimensional model from a one-pass rendering process (e.g., as may be the case for the other three-dimensional models), to a multi-pass rendering process, where the output of each pass is composited to generate the final output image. An example multi-pass rendering process is described further below with respect to FIG. 3, and an example compositing process is described further below with respect to FIG. 5. Example passes of a multi-pass rendering process are described further below with respect to FIGS. 4 and 6-8.

Figure 2:
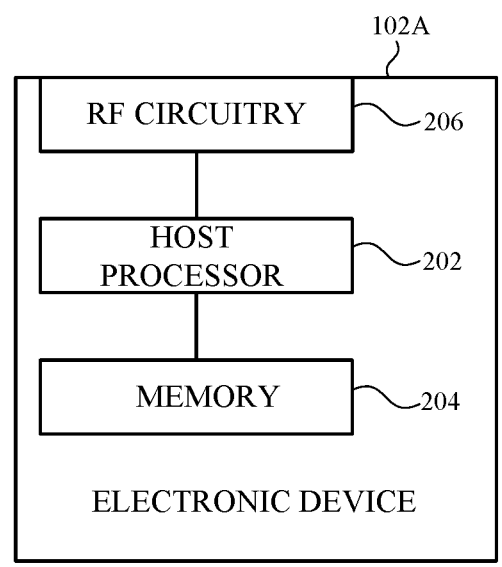
FIG. 2 illustrates an example electronic device that may perform multi-pass object rendering using a three-dimensional geometric constraint in accordance with one or more implementations.

FIG. 2 illustrates an example electronic device 102A that may perform multi-pass object rendering using a three-dimensional geometric constraint in accordance with one or more implementations. The electronic device 102A is depicted in FIG. 2 for explanatory purposes; however, one or more of the components of the electronic device 102A may also be implemented by one or more of the other electronic devices 102B-C. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102A may include a host processor 202, a memory 204, and radio frequency (RF) circuitry 206. The RF circuitry 206 may include one or more antennas and one or more transceivers for transmitting/receiving RF communications, such as WiFi, Bluetooth, cellular, and the like.

The host processor 202 may include suitable logic, circuitry, and/or code that enable processing data and/or controlling operations of the electronic device 102A. In this regard, the host processor 202 may be enabled to provide control signals to various other components of the electronic device 102A. Additionally, the host processor 202 may enable implementation of an operating system or may otherwise execute code to manage operations of the electronic device 102A.

The memory 204 may include suitable logic, circuitry, and/or code that enable storage of various types of information such as received data, generated data (such as three-dimensional models, two-dimensional images, configuration files, components/assets, and the like), code, and/ or configuration information. The memory 204 may include, for example, random access memory (RAM), read-only memory (ROM), flash, and/or magnetic storage.

In one or more implementations, the host processors 202, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
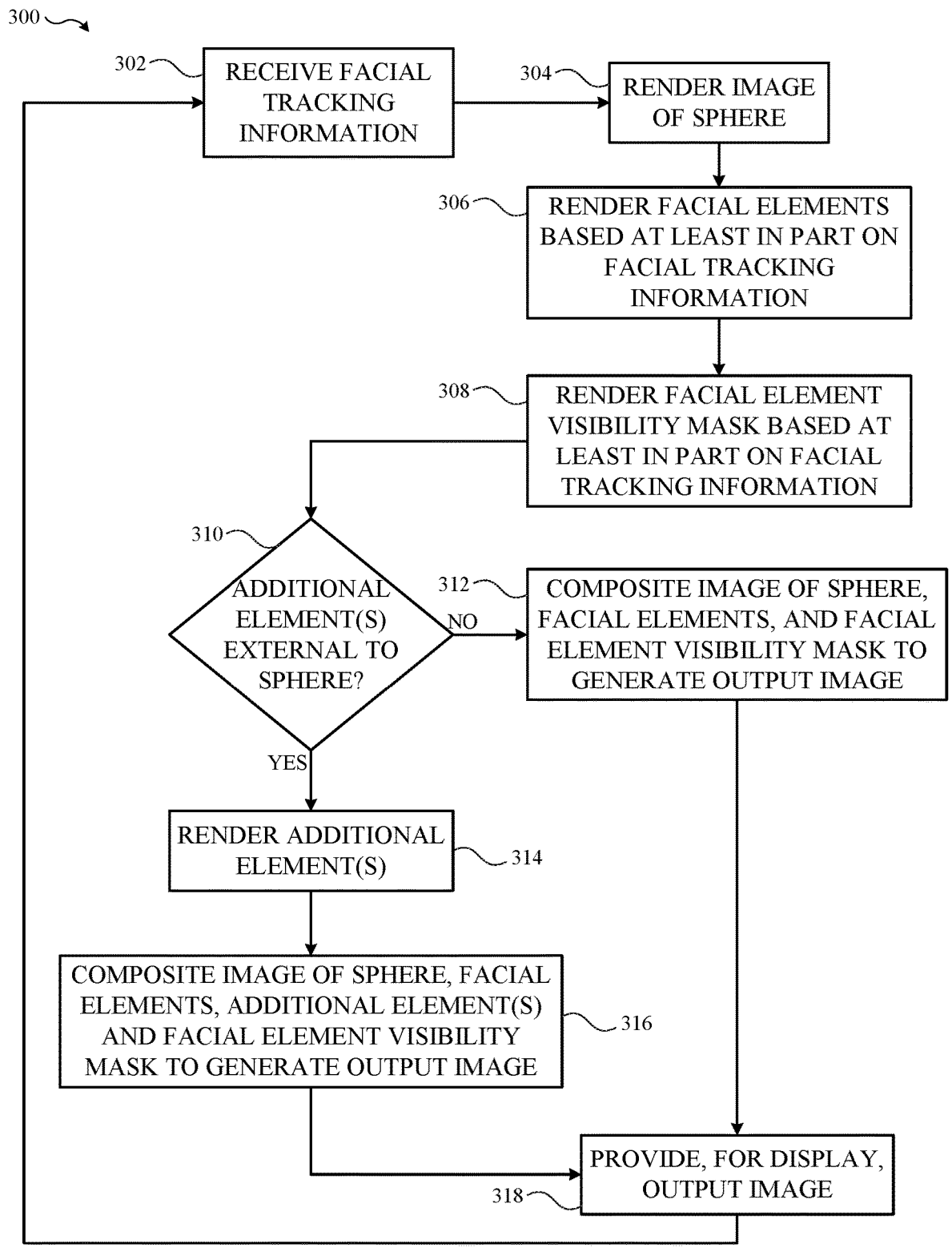
FIG. 3 illustrates a flow diagram of an example process of multi-pass object rendering using a three-dimensional geometric constraint in accordance with one or more implementations.

FIG. 3 illustrates a flow diagram of an example process 300 of multi-pass object rendering using a three-dimensional geometric constraint in accordance with one or more implementations. For explanatory purposes, the process 300 is primarily described herein with reference to the electronic device 102A of FIGS. 1-2. However, the electronic device 102A is presented as an exemplary device and the operations described herein may be performed by any suitable devices, such as the other electronic devices 102B-C. Further, for explanatory purposes, the operations of the process 300 are described herein as occurring in serial, or linearly. However, multiple operations of the process 300 may occur in parallel, such that they at least partially overlap in time. In addition, the operations of the process 300 need not be performed in the order shown and/or one or more of the operations of the process 300 need not be performed and/or can be replaced by other operations.

The process 300 begins with the electronic device 102A receiving facial tracking information (302). For example, the electronic device 102A may locally generate the facial tracking information, such as by capturing measurements from infrared dots projected onto the face of the user by the electronic device 102A. The facial tracking information may track movement of various individual facial/head features, such as eyes, eyebrows, nose, mouth, tongue, ears, cheeks, and the like.

The electronic device 102A renders an image of a sphere (304). The electronic device 102A may instruct, e.g., a graphics processing unit (GPU), to constrain each point being rendered on the surface of the sphere to be a particular distance from a center point of the sphere. The constraining may cause the sphere to be rendered with a more smooth surface, with little or no visible polygons.

The electronic device 102A renders an image containing the facial elements based at least in part on the face tracking information (306). The facial elements may also be rendered with a constraint based on the surface of the sphere. For example, the electronic device 102A may determine which facial features to include based at least in part on the facial tracking information. The electronic device 102A may utilize one or more heuristics to determine which facial features to include in the facial elements.

For example, the electronic device 102A may determine that the nose of the user should not be represented in the facial elements since the smiley face emoticon does not include a nose. In addition, the electronic device 102A may determine whether to include facial features corresponding to eyebrows based on whether the user has lifted their eyebrows a threshold distance from a base eyebrow position.

The electronic device 102A may select a mouth facial element from multiple different base mouth elements. The base mouth elements may correspond to different types of mouths that may be used on emoticons, such as smiley face emoticons and variations thereof. For example, one base mouth element may be a mouth in the form of a smile, another base mouth element may be a mouth in the form of an 'o' and another base mouth element may be a mouth used to represent a kissing emoticon, which may be in the form of a '3'.

After selecting the base mouth element, the electronic device 102A may adjust the base mouth element based at least in part on the facial tracking information, e.g., the facial tracking information that corresponds to the mouth of the user. The electronic device 102A may also optionally determine whether to include teeth in the mouth, such as based on how wide the user's mouth is open. For example, if the user's mouth is open more than a threshold distance, then the electronic device may determine that teeth should be included.

In one or more implementations, the electronic device 102A may also determine whether a base of a tongue should be included in the mouth element. For example, if the user is sticking their tongue out (e.g., as determined from the facial tracking information), then the electronic device 102A may include the base of the tongue in the mouth (with the remainder of the tongue being added below).

After rendering the facial elements (306), the electronic device 102A may render a facial element visibility mask (e.g., in the form of an image) based at least in part on the facial tracking information (308). The facial element visibility mask may be rendered to mask the portions of the rendered facial elements that should not be visible to user, e.g., based at least in part on the shape of the sphere, orientation of the user's head, etc. The facial element visibility mask may also be constrained to the surface of the sphere. In one or more implementations, the facial element visibility mask may be a one sided duplicate geometry with flipped normals.

The facial element visibility mask may coincide with the facial elements, and therefore may be adjusted similarly to the facial elements to reflect the current face tracking information, e.g. with or without eyebrows, different base mouth types, etc.

After rendering the facial element visibility mask (308), the electronic device 102A determines whether there are any additional elements external to the sphere to be rendered (310). For example, if the electronic device 102A determines that the user is sticking their tongue out (e.g., based on the facial tracking information), the electronic device 102A may determine that an extended/protruding tongue should be added to the surface of the sphere. In one or more implementations, the electronic device 102A may determine to render other elements external to the sphere, such as props, accessories (e.g., glasses, hats, etc.), and the like. Since the additional element(s) are external to the sphere, the facial element visibility mask does not need to be adjusted to account for the additional element(s).

If the electronic device 102A determines that there is an additional element to render external to the sphere (310), the electronic device 102A render the additional element (314). The electronic device 102A then composites the image of the sphere, the facial elements, the additional element(s), and the facial element visibility mask to generate the output image (316), and provides the output image for display (318). If the electronic device 102A determines that there are no additional elements external to the sphere to render (310), the electronic device composites the image of the sphere, the facial elements, and the facial element visibility mask to generate the output image (312).

An example process of compositing the images is discussed further below with respect to FIG. 5. Since the sphere, the facial elements, and the facial element visibility mask are each individually constrained to the surface of the sphere, the respective images can be composited without any visible gaps or any other visible artifacts/distortion.

The electronic device 102A may continuously perform the process 300 in real-time such that the electronic device 102A can output the images in a continuous manner to provide an animated three-dimensional representation of the smiley face emoticon that has facial movements that mirror the movements of the user.

Figure 4:
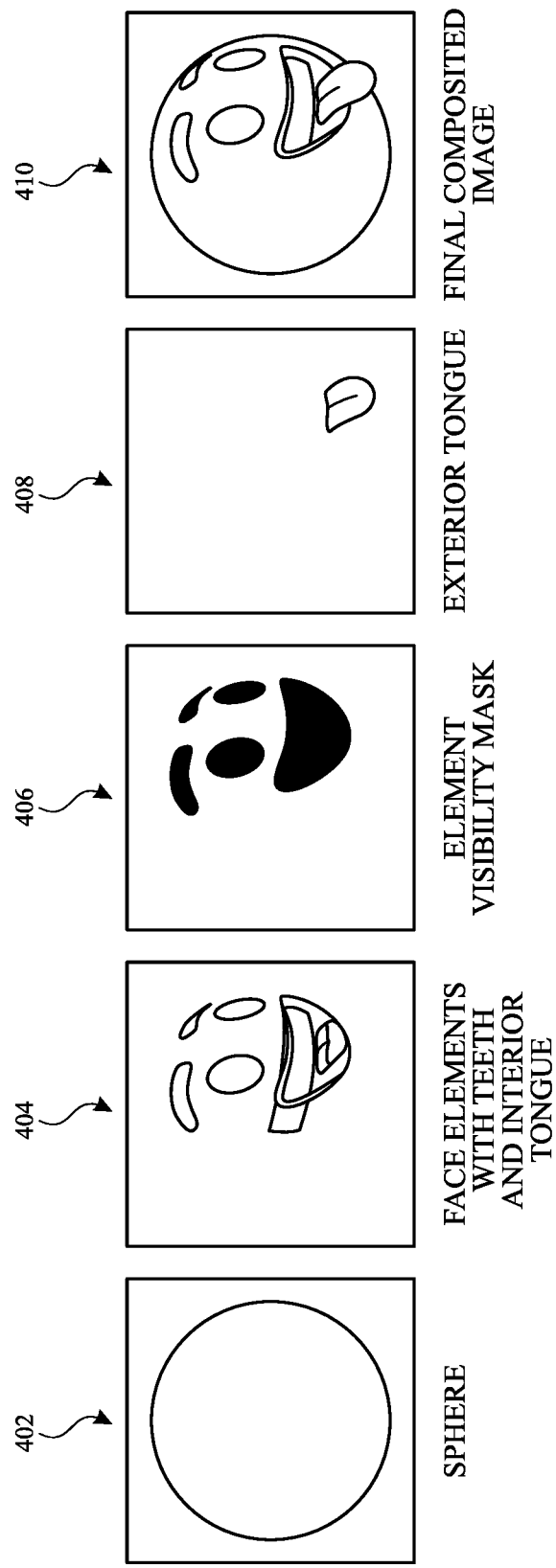
FIG. 4 illustrates examples of rendering passes for multi-pass object rendering using a three-dimensional geometric constraint in accordance with one or more implementations.

FIG. 4 illustrates examples of rendering passes for multi-pass object rendering using a three-dimensional geometric constraint in accordance with one or more implementations. Not all of the depicted rendering passes may be used in all implementations, however, and one or more implementations may include additional or different rendering passes than those shown in the figure. Variations in the arrangement and type of the rendering passes may be made without departing from the spirit or scope of the claims as set forth herein. Additional components, different components, or fewer components may be provided.

In the first rendering pass, the electronic device 102A renders an image of a sphere 402. In the second rendering pass, the electronic device 102A renders the facial elements 404. As shown in FIG. 4, the facial elements include teeth and a base of the tongue. For example, the electronic device 102A may have determined, based at least in part on the current facial tracking information, that the mouth of the user is open by more than a threshold amount and the user is sticking out their tongue. Similarly, the electronic device 102A may also have determined to include eyebrows, such as based on the eyebrows of the user being raised by more than a threshold distance from a base eyebrow position.

In the third rendering pass, the electronic device 102A renders the facial element visibility mask 406. The facial element visibility mask includes mask elements that coincide with the facial elements included in the second rendering pass, such as eyebrows. The mouth of the facial element visibility mask is similarly selected from a base mouth type that corresponds to an open mouth.

In the fourth rendering pass, the electronic device 102A renders an additional element 408 that is external to the sphere, e.g. a tongue. For example, the electronic device 102A may have determined that the user is sticking out their tongue based at least in part on the facial tracking information. In one or more implementations, the additional element may include one or more other external elements, such as a hat, glasses, or generally any element that is external to the sphere.

In the fifth rendering pass, the electronic device 102A composites the images generated in the first four passes to generate an output image 410. An example compositing process is discussed further below with respect to FIG. 5.

Figure 5:
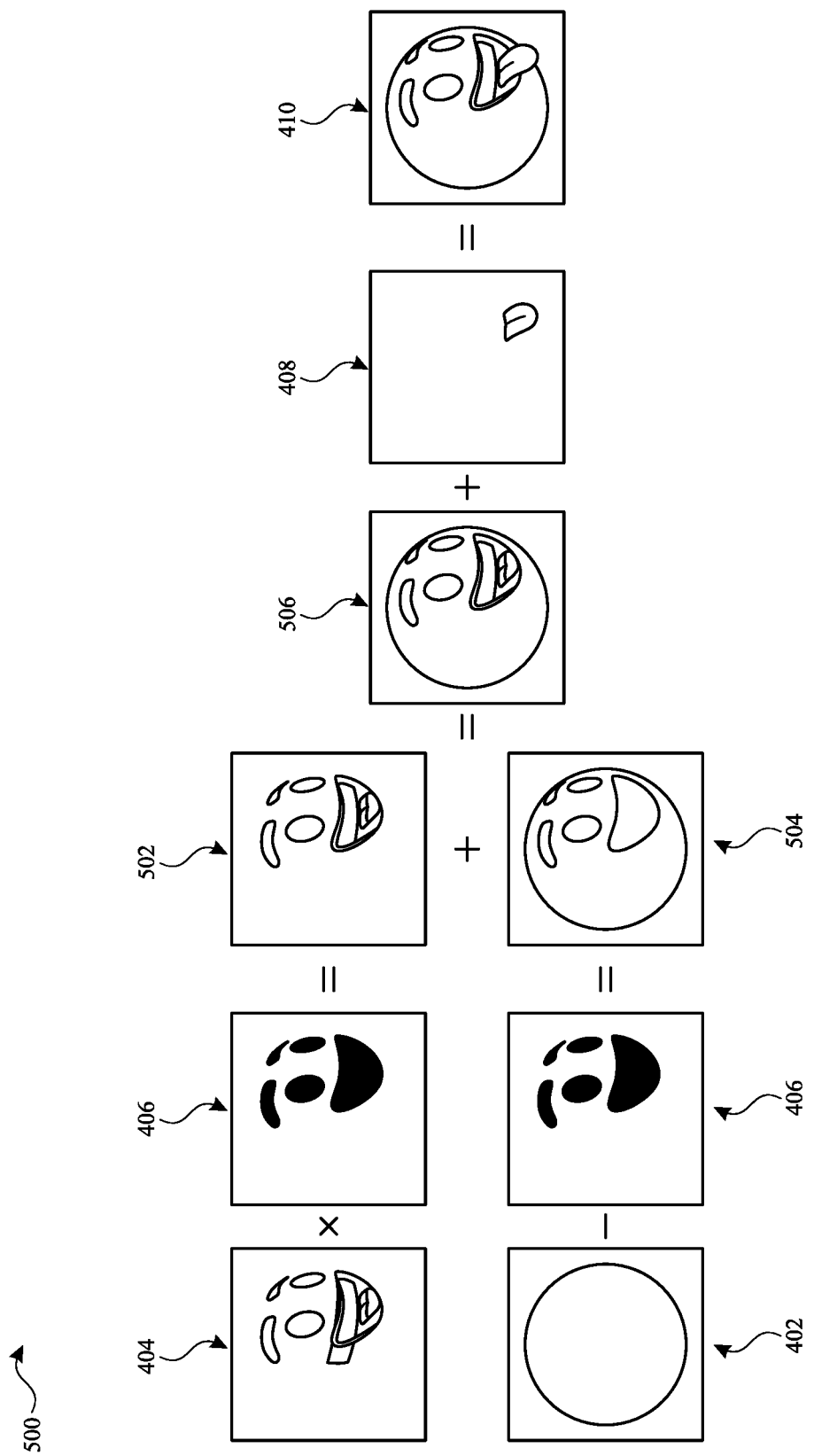
FIG. 5 illustrates an example compositing process for multi-pass object rendering using a three-dimensional geometric constraint in accordance with one or more implementations.

FIG. 5 illustrates an example compositing process 500 for multi-pass object rendering using a three-dimensional geometric constraint in accordance with one or more implementations. For explanatory purposes, the process 500 is primarily described herein with reference to the electronic device 102A of FIGS. 1-2. However, the electronic device 102A is presented as an exemplary device and the operations described herein may be performed by any suitable devices, such as the other electronic devices 102B-C. Further, for explanatory purposes, the operations of the process 500 are described herein as occurring in serial, or linearly. However, multiple operations of the process 500 may occur in parallel, such that they at least partially overlap in time. In addition, the operations of the process 500 need not be performed in the order shown and/or one or more of the operations of the process 500 need not be performed and/or can be replaced by other operations.

In the example compositing process 500, the facial element visibility mask 406 is subtracted from the image of the sphere 402 to generate an image of a visible sphere 504. The facial elements 404 are multiplied by the facial element visibility mask 406 to generate the visible facial features 502. The visible facial features 502 are added to the image of the visible sphere 504 to generate an initial output image 506. Since the image of the sphere 402, the facial elements 404, and the facial element visibility mask 406 were each individually rendered with a constraint based on the surface of the sphere, the images can be composited to form the initial output image 506 without there being any gaps, artifacts, or other distortions in the initial output image 506.

If there are no external elements to add to the surface of the sphere, the initial output image 506 would be the output image. However, in FIG. 5, the electronic device 102A also rendered the additional element 408 external to the sphere. Thus, the additional element 408 is added to the initial output image 506 to generate the output image 410.

Figure 6:
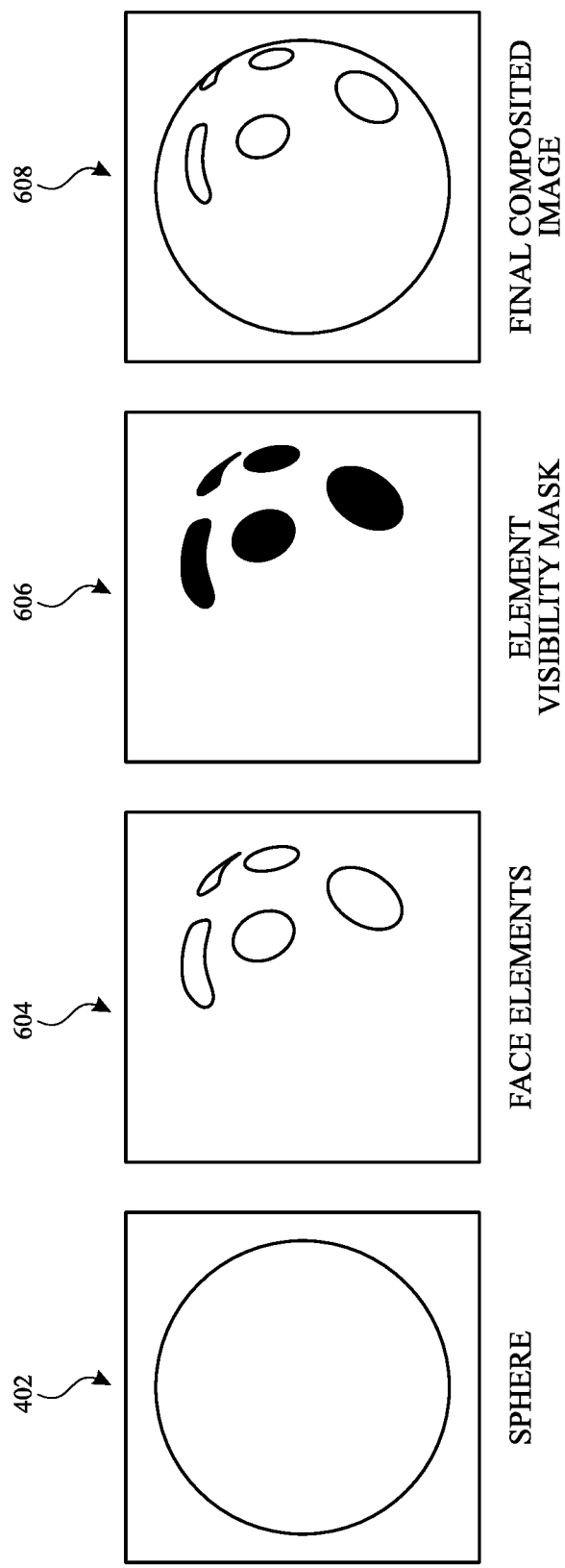
FIG. 6 illustrates examples of rendering passes for multi-pass object rendering using a three-dimensional geometric constraint in accordance with one or more implementations.

FIG. 6 illustrates examples of rendering passes for multi-pass object rendering using a three-dimensional geometric constraint in accordance with one or more implementations. Not all of the depicted rendering passes may be used in all implementations, however, and one or more implementations may include additional or different rendering passes than those shown in the figure. Variations in the arrangement and type of the rendering passes may be made without departing from the spirit or scope of the claims as set forth herein. Additional components, different components, or fewer components may be provided.

In the first rendering pass, the electronic device 102A renders an image of a sphere 402. In the second rendering pass, the electronic device 102A renders the facial elements 604. As shown in FIG. 6, the facial elements include a base mouth in the shape of an 'o'. For example, the electronic device 102A may have determined, based at least in part on the current facial tracking information, that the mouth of the user is open in the shape of an 'o'. Similarly, the electronic device 102A may also have determined to include eyebrows, such as based on the eyebrows of the user being raised by more than a threshold distance from a base eyebrow position.

In the third rendering pass, the electronic device 102A renders the facial element visibility mask 606. The facial element visibility mask 606 includes mask elements that coincide with the facial elements included in the second rendering pass, such as eyebrows. The mouth of the facial element visibility mask 606 is similarly selected from a base mouth type that corresponds to an 'o' shaped mouth.

In the fourth rendering pass, the electronic device 102A composites the images generated in the first three passes to generate an output image 608. An example compositing process is discussed further above with respect to FIG. 5.

Figure 7:
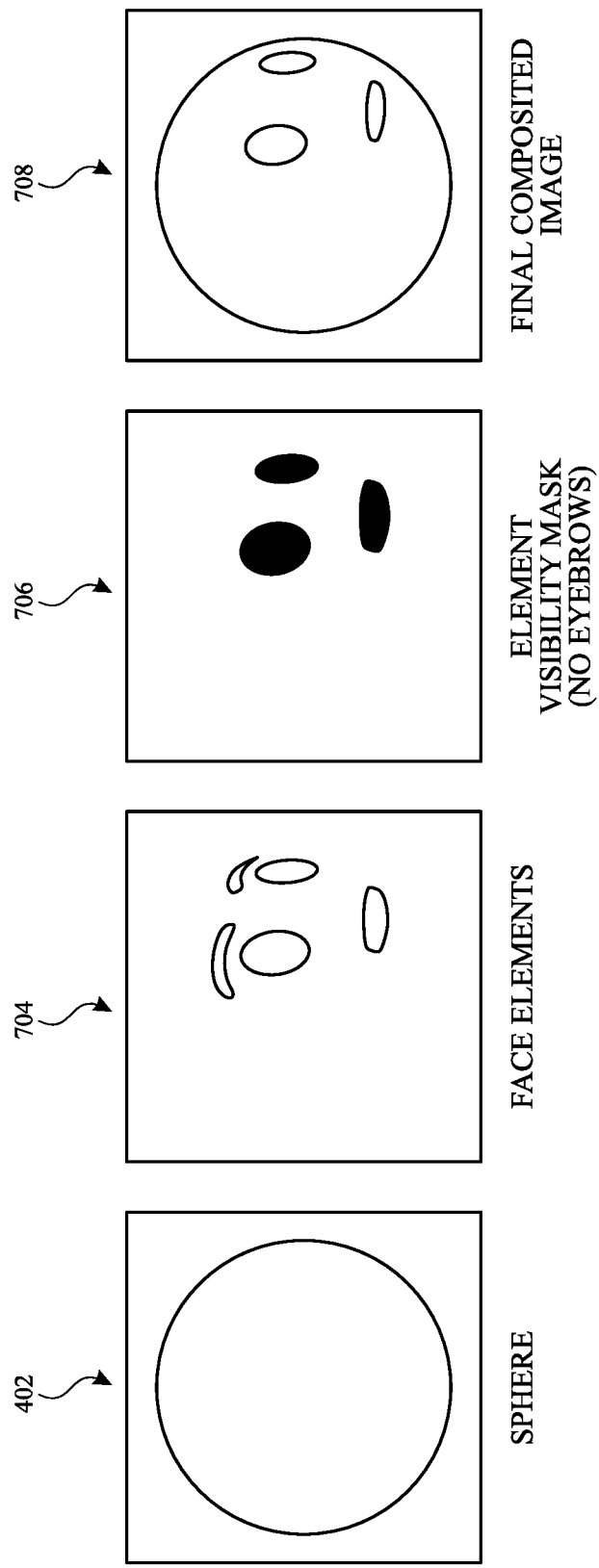
FIG. 7 illustrates examples of rendering passes for multi-pass object rendering using a three-dimensional geometric constraint in accordance with one or more implementations.

FIG. 7 illustrates examples of rendering passes for multi-pass object rendering using a three-dimensional geometric constraint in accordance with one or more implementations. Not all of the depicted rendering passes may be used in all implementations, however, and one or more implementations may include additional or different rendering passes than those shown in the figure. Variations in the arrangement and type of the rendering passes may be made without departing from the spirit or scope of the claims as set forth herein. Additional components, different components, or fewer components may be provided.

In the first rendering pass, the electronic device 102A renders an image of a sphere 402. In the second rendering pass, the electronic device 102A renders the facial elements 704. As shown in FIG. 7, the facial elements include another base mouth type and the facial elements do not include any eyebrows. For example, the electronic device 102A may have determined not to include eyebrows, such as based on the eyebrows of the user not being raised by more than a threshold distance from a base eyebrow position.

In the third rendering pass, the electronic device 102A renders the facial element visibility mask 706. The facial element visibility mask includes mask elements that coincide with the facial elements included in the second rendering pass and therefore does not include eyebrows.

In the fourth rendering pass, the electronic device 102A composites the images generated in the first three passes to generate an output image 708. An example compositing process is discussed further above with respect to FIG. 5.

Figure 8:
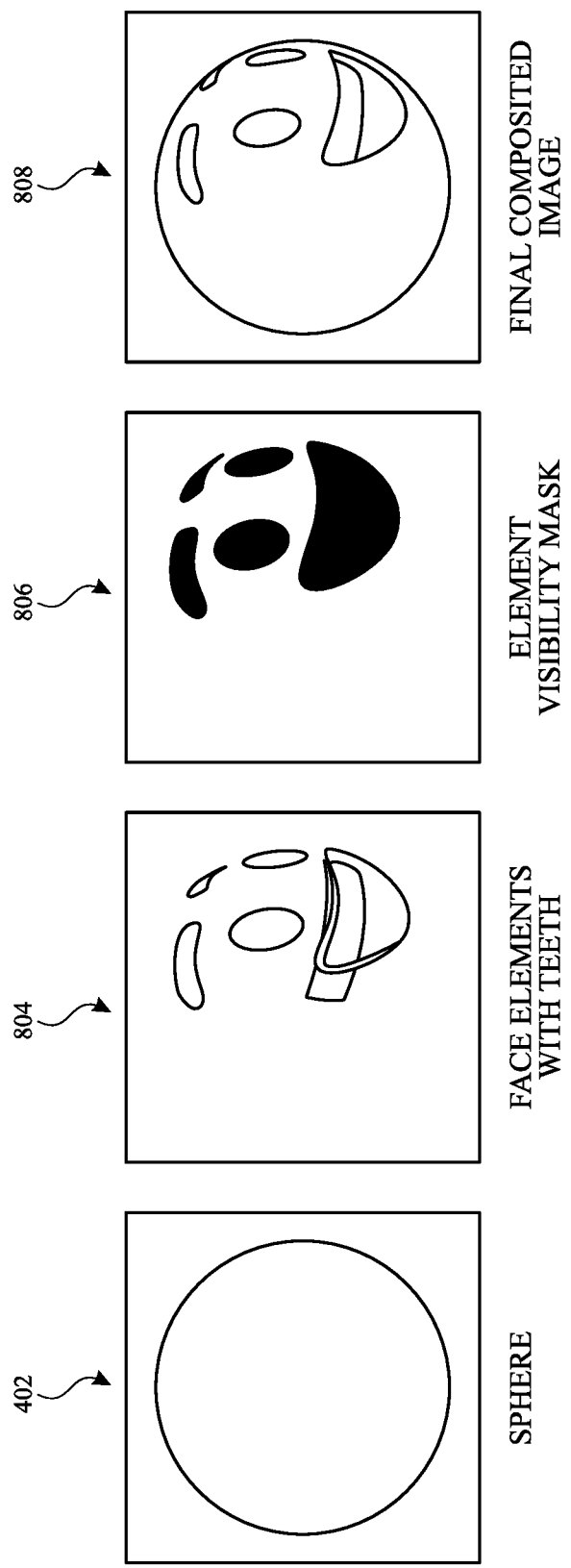
FIG. 8 illustrates examples of rendering passes for multi-pass object rendering using a three-dimensional geometric constraint in accordance with one or more implementations.

FIG. 8 illustrates examples of rendering passes for multi-pass object rendering using a three-dimensional geometric constraint in accordance with one or more implementations. Not all of the depicted rendering passes may be used in all implementations, however, and one or more implementations may include additional or different rendering passes than those shown in the figure. Variations in the arrangement and type of the rendering passes may be made without departing from the spirit or scope of the claims as set forth herein. Additional components, different components, or fewer components may be provided.

In the first rendering pass, the electronic device 102A renders an image of a sphere 402. In the second rendering pass, the electronic device 102A renders the facial elements 804. For example, the electronic device 102A may have determined, based at least in part on the current facial tracking information, that the mouth of the user is open wide enough to satisfy a threshold for including teeth. Similarly, the electronic device 102A may also have determined to include eyebrows, such as based on the eyebrows of the user being raised by more than a threshold distance from a base eyebrow position.

In the third rendering pass, the electronic device 102A renders the facial element visibility mask 806. The facial element visibility mask 806 includes mask elements that coincide with the facial elements included in the second rendering pass, such as eyebrows. The mouth of the facial element visibility mask is similarly selected from a base mouth type that corresponds to the wide open smiling mouth.

In the fourth rendering pass, the electronic device 102A composites the images generated in the first three passes to generate an output image 808. An example compositing process is discussed further above with respect to FIG. 5.

Figure 9:
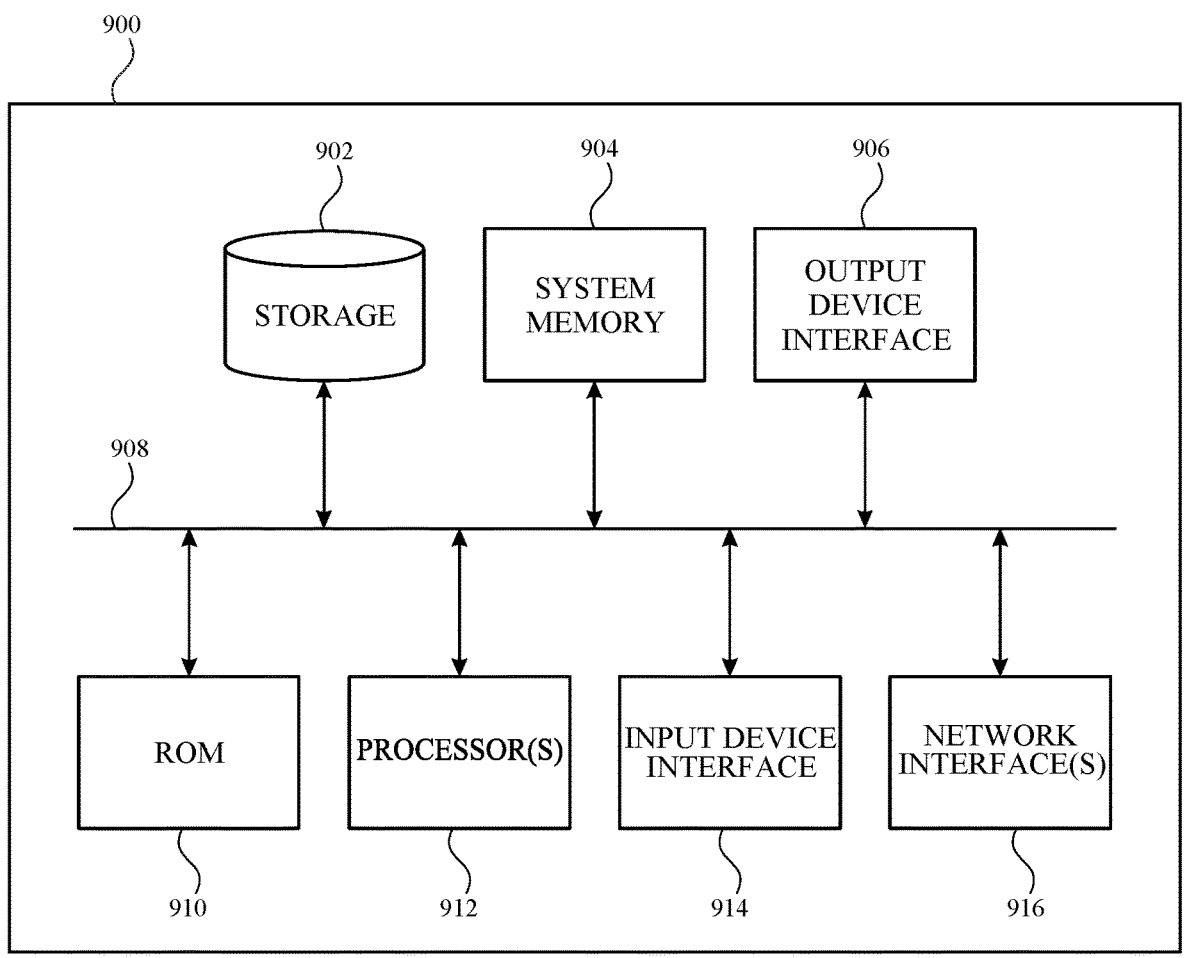
FIG. 9 conceptually illustrates an example electronic system with which aspects of the subject technology may be implemented in accordance with one or more implementations.

FIG. 9 conceptually illustrates an electronic system 900 with which one or more implementations of the subject technology may be implemented. The electronic system 900 can be, and/or can be a part of, one or more of the electronic devices 102A-C, and/or the service provider server 108 shown in FIG. 1. The electronic system 900 may include various types of computer readable media and interfaces for various other types of computer readable media. The electronic system 900 includes a bus 908, one or more processing unit(s) 912, a system memory 904 (and/or buffer), a ROM 910, a permanent storage device 902, an input device interface 914, an output device interface 906, and one or more network interfaces 916, or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic system 900 to one or more networks and/or to one or more network nodes, through the one or more network interface(s) 916. In this manner, the electronic system 900 can be a part of a network of computers (such as a LAN, a wide area network ("WAN"), or an Intranet, or a network of networks, such as the Internet. Any or all components of the electronic system 900 can be used in conjunction with the subject disclosure.

As described above, one aspect of the present technology is the gathering and use of data available from specific and legitimate sources to improve image generation. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to display or not display facial features (e.g., eyebrows) in accordance with a user's preferences. Accordingly, use of such personal information data enables users to have greater control of the displayed three-dimensional model. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of facial tracking information, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, multi-pass object rendering using a three-dimensional geometric constraint can be performed based on aggregated non-personal information data or a bare minimum amount of personal information, such as the information being handled only on the user's device or other non-personal information available.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
receiving a mesh of points corresponding to a head of a user;
rendering an image of a sphere;
rendering elements corresponding to facial features based at least in part on the mesh of points;
rendering an element visibility mask based at least in part on the mesh of points, the element visibility mask being constrained to the surface of the sphere; and
compositing the sphere, the elements, and the element visibility mask to generate an output image; and
providing the output image for display.

2. The method of claim 1, wherein rendering the image of the sphere comprises constraining points being rendered on the surface of the sphere to a particular distance from a center point of the sphere.

3. The method of claim 1, further comprising:
rendering an image comprising an element that overlays onto a surface of the sphere.

4. The method of claim 3, wherein the element that overlays onto the surface of the sphere comprises a tongue when the mesh of points indicates that a tongue is extending from the head of the user.

5. The method of claim 4, wherein compositing the sphere, the elements and the element visibility mask to generate the output image further comprises compositing the sphere, the elements, the element visibility mask, and the image to generate the output image.

6. The method of claim 1, wherein the compositing comprises:
multiplying the elements corresponding to the facial features by the element visibility mask to generate visible facial features;
subtracting the element visibility mask from the image of the sphere to generate an image of a visible sphere; and
adding the visible facial features to the image of the visible sphere to generate the output image.

7. The method of claim 1, wherein at least one of the elements corresponding to the facial features comprises a mouth element, and the method further comprising:
selecting a base mouth element from a plurality of base mouth elements based at least in part on the mesh of points; and
adjusting the selected base mouth element based at least in part on the mesh of points to generate the mouth element.

8. The method of claim 7, wherein the selected base mouth element differs from a base mouth element of a previous output image that was provided for output immediately prior to the output image.

9. The method of claim 1, further comprising:
determining, based at least in part on the mesh of points and at least one other mesh of points corresponding to an immediately prior time period, whether at least one eyebrow on the head of the user has moved a threshold distance from a base eyebrow position; and
when the at least one eyebrow on the head of the user has moved the threshold distance, including at least one element corresponding to the at least one eyebrow in the elements corresponding to the facial features, otherwise excluding the at least one eyebrow from the elements corresponding to the facial features.

10. The method of claim 1, further comprising:
obtaining the mesh of points from the head of the user.

11. The method of claim 1, wherein the elements corresponding to the facial features are exclusive of a nose.

12. A device comprising:
a memory; and
at least one processor configured to:
render an image of a three-dimensional geometric object;
determine, based at least in part on information corresponding to a head of a user, at least one facial feature of the user;
render at least one element corresponding to the at least one facial feature and a visibility mask that masks a portion of the at least one element with respect to the three-dimensional geometric object; and
render an output image based at least in part on the image of the three-dimensional geometric object, the at least one element, and the visibility mask.

13. The device of claim 12, wherein the render of the visibility mask is constrained to a surface of the three-dimensional geometric object.

14. The device of claim 12, wherein the three-dimensional geometric object comprises a sphere and points rendered on a surface of the sphere are constrained to a particular distance from a center point of the sphere.

15. The device of claim 12, wherein the at least one processor is configured to render the output image based at least in part on the image of the three-dimensional geometric object, the at least one element, and the visibility mask by:
multiplying the at least one element corresponding to the at least one facial feature by the visibility mask to generate at least one visible facial feature;
subtracting the visibility mask from the image of the three-dimensional geometric object to generate an image of a visible three-dimensional geometric object; and
adding the at least one visible facial feature to the image of the visible three-dimensional geometric object to generate the output image.

16. The device of claim 12, wherein the at least one processor is further configured to:
determine a position of the at least one element corresponding to the at least one facial feature is based at least in part on a position of the at least one facial feature on the head of the user and an orientation of the head of the user.

17. The device of claim 12, wherein the at least one processor is further configured to:
generate the information corresponding to the head of the user based at least in part on a mesh of points generated from the head of the user.

18. A non-transitory machine-readable medium comprising code that, when executed by one or more processors, causes the one or more processors to perform operations, the code comprising:
code to render respective images of a geometric object
code to render respective images of facial features based at least in part on facial tracking information corresponding to a face of a user;
code to render respective images of facial feature visibility masks based at least in part on the facial tracking information and a surface of the geometric object; and
code to render respective output images by compositing the respective images of the geometric object, the respective images of the facial features and the respective images of the facial feature visibility masks to generate the respective output images; and code to provide the respective output images for display.

19. The non-transitory machine-readable medium of claim 18, wherein the facial tracking information comprises respective meshes of points, and the code further comprises:

code to obtain the respective meshes of points from the face of the user.

20. The non-transitory machine-readable medium of claim 18, wherein at least one of the facial features comprises at least one of a mouth, an eye, or an eyebrow.

\* \* \* \* \*